Aug. 2, 1966 G. A. GAGNON 3,263,467

COMPONENT INSERTING HEAD

Filed March 20, 1963 6 Sheets-Sheet 1

INVENTOR:

George A. Gagnon

By

Hofgren, Wegner, Allen, Stellman & McCord, Attys

Aug. 2, 1966 G. A. GAGNON 3,263,467

COMPONENT INSERTING HEAD

Filed March 20, 1963 6 Sheets-Sheet 2

COMPONENT INSERTING HEAD

Filed March 20, 1963 6 Sheets-Sheet 3

United States Patent Office 3,263,467
Patented August 2, 1966

3,263,467

COMPONENT INSERTING HEAD

George A. Gagnon, Wilmette, Ill., assignor to Warwick Electronics Inc., a corporation of Delaware Filed Mar. 20, 1963, Ser. No. 266,596
13 Claims. (Cl. 72—131)

This invention relates to the shaping and insertion of electrical circuit components and more particularly to a shaping and inserting head for handling components of different lengths.

An object of this invention is to provide a new and improved electrical component shaping and inserting head.

In certain electronic equipment, such as radios and television sets, circuit boards are used on which a number of electrical components are mounted. Many of these components are mounted on the circuit board by assembly lines which convey the boards past a series of stations with each station having one or more component inserting heads. The requirements as to the type and length of components can vary from one circuit board layout to another and it is the purpose of the mechanism of this invention to render an inserting head at a station more versatile as to the length of component that can be handled thereby.

Another object of this invention is to provide a shaping and inserting head for electrical components in which the head is adjustable to handle various lengths of components whereby a single head may satisfy a variety of component installation requirements, which now require a different head for each length of component, and thus reduce the total number of heads required which results in a lesser investment in such equipment.

A further object of the invention is to provide a shaping and inserting head for electrical components in which the head may have the parts thereof shaped to handle jumper wire formed either flat or in other cross sectional configurations, with the handling parts being adjustable and interrelated in their adjustment for simple set up for different lengths of jumper wire components, or the head by having parts shaped differently may handle other components, such as resistors with wire leads extending from opposite ends thereof and again the parts are adjustable and interrelated in the adjustment to handle different lengths of components.

Still another object of the invention is to provide a shaping and inserting head for electrical components having a frame with an anvil formed of two members adjustable, one with respect to the other, to provide a predetermined anvil width, a slide movable on the frame and relative to the anvil to shape the component while held by the anvil with the slide being formed of two members adjustable one with respect to the other to provide a predetermined width for the slide and a ram movable relative to the slide and formed of two members adjustable, one with respect to the other, to provide a predetermined ram width and with connections between the movable members of the anvil, slide and ram whereby a single adjustment adapts the head for the desired length of component to be handled.

Further objects and advantages will become apparent from the following detailed description taken in connection with the accompanying drawings in which.

Figures 1, 2, 3:
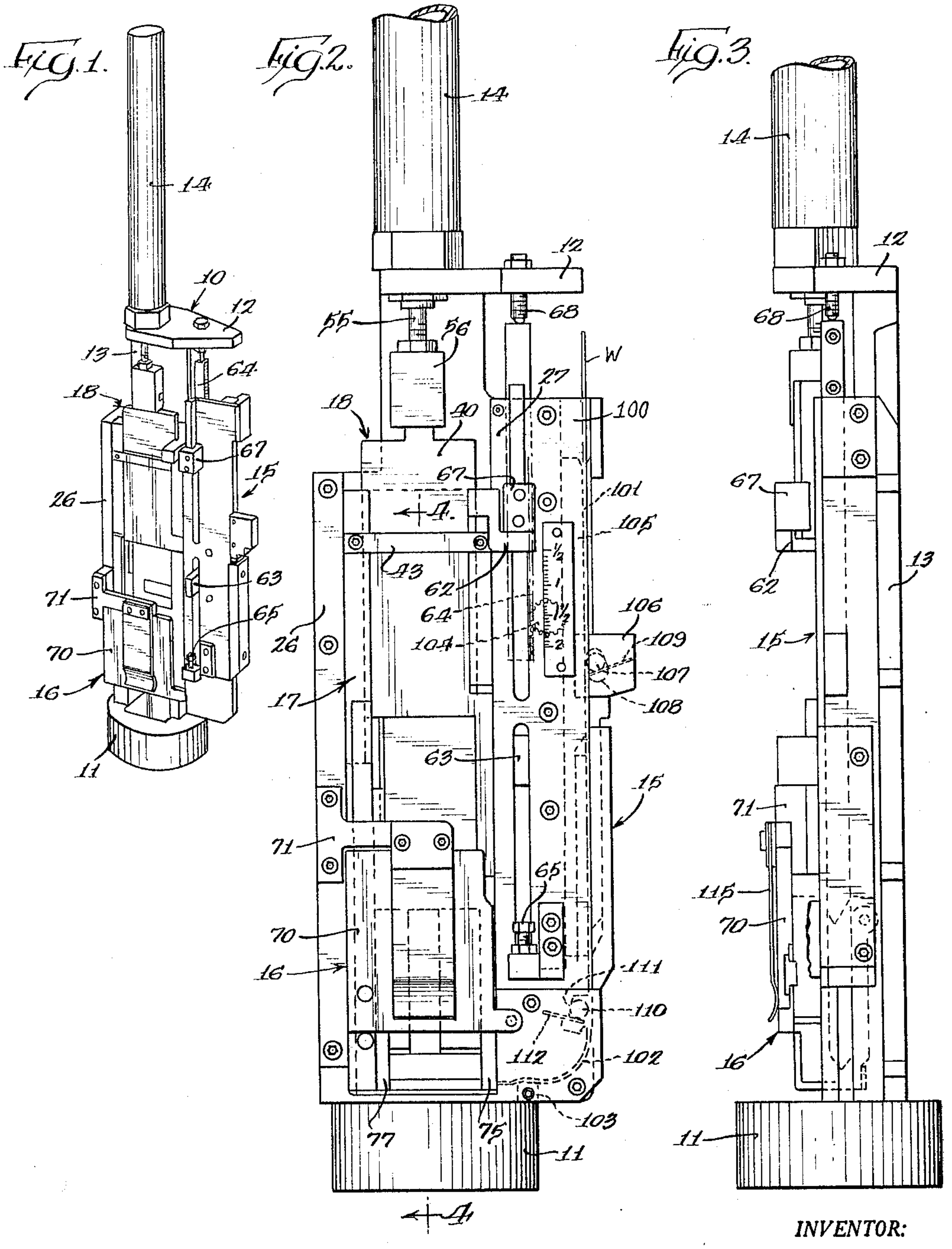
FIG. 1 is a perspective view of the shaping and inserting head of the preferred embodiment.
FIG. 2 is a front elevational view of the head shown in FIG. 1 on an enlarged scale.
FIG. 3 is a side elevational view, looking toward the right-hand side of the head as shown in FIG. 2.

While this invention is susceptible of embodiment in many different forms, there is shown in the drawings and will herein be described in detail an embodiment of the invention together with a modification thereof with the understanding that the present disclosure is to be considered as an exemplification of the principles of the invention and is not intended to limit the invention to the embodiment illustrated. The scope of the invention will be pointed out in the appended claims.

The shaping and inserting head of the preferred embodiment is shown generally in FIGS. 1, 2 and 3. The head has a frame indicated generally at 10, with a base 11 at one end and a support plate 12 at the other end interconnected by a frame section 13 with the plate 12 mounting an operating motor which, as shown, takes the form of an air cylinder 14.

The frame 10 mounts a plurality of devices which together form the operative head. A feeding mechanism, indicated generally at 15, functions to supply a section of jumper wire, which is shaped by mechanism, to be described, into a generally U-shaped electrical component for insertion in a circuit board for subsequent use in electrical devices, such as radios and television sets. As shown herein, parts are shaped to handle wire which is relatively flat in cross section; however, other cross-sectional shapes can be utilized if desired.

The parts of the head for shaping and inserting the component include a former, such as the anvil indicated generally at 16; a slide, indicated generally at 17, which is movable lengthwise of the frame 10; and a ram, indicated generally at 18, which is movable with and relative to the slide 17 for accomplishing insertion of the component into a circuit board.

Figure 4:
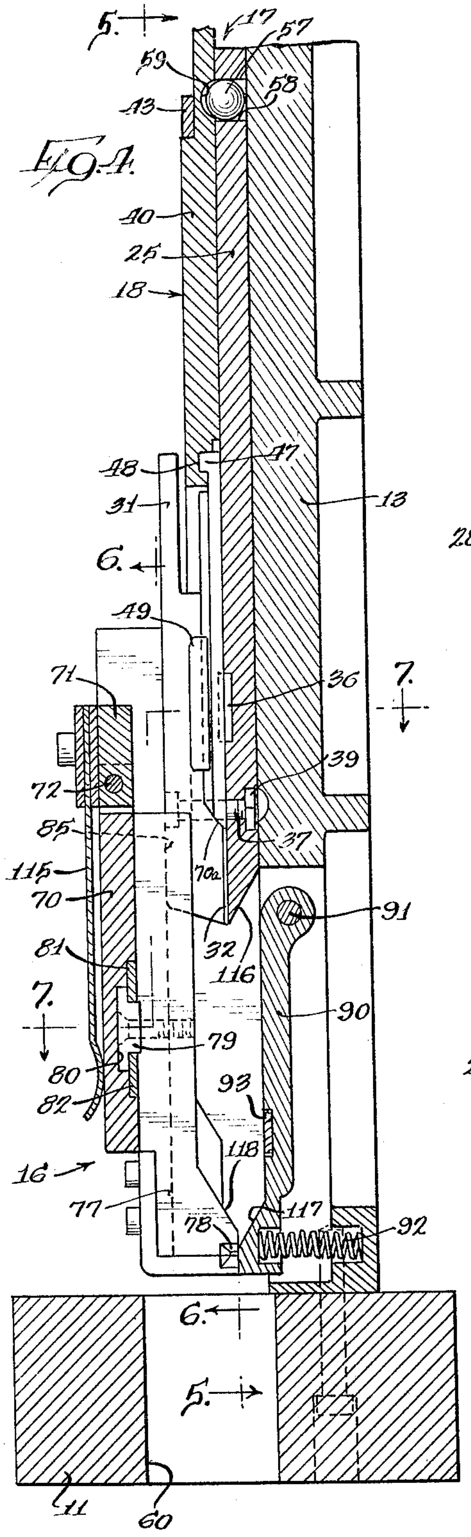
FIG. 4 is a vertical section on an enlarged scale taken generally along the line 4—4 in FIG. 2.
Figure 7:
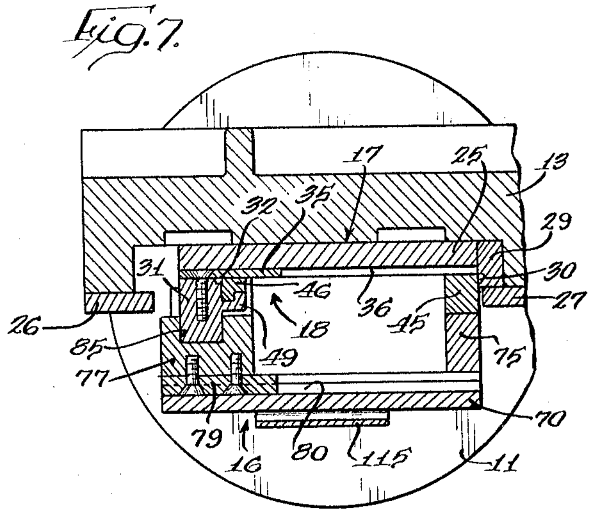
FIG. 7 is a fragmentary section taken generally along the line 7—7 in FIG. 4.

First referring to the slide 17, the slide has a planar body 25, as shown in FIGS. 4 and 7, which moves along a face of the frame section 13 and is movably guided on the frame behind a pair of plates 26 and 27, which are secured to the frame and form channels for lateral extremities 28 and 29 of the member 25. The part 28 does not show in FIG. 7, since the section is taken below the point where this part is located, but it is shown in broken line in FIG. 5.

The extremity 29 of the slide 17 at its lower end defines a slide member which functions as a cut-off member to cut off a length of jumper wire from the supply and is also formed with a recess 30 which passes by the anvil 16 to receive and bend about the anvil an end of the jumper wire. The slide 17 also has another slide member 31, with a similar recess 32 in the same plane as the recess 30 and this member 31 passes along the opposite side of the anvil 16 to shape the opposite end of the jumper wire and the recesses 30 and 32, together, support the formed jumper wire after release thereof from the anvil 16, as subsequently described.

The slide member 31 is laterally adjustable with respect to the slide member 29 to provide a variable effective width for the slide 17. This adjustment is obtained by mounting a tab 35 secured to the slide member 31 in a channel 36 formed in the front face of the slide body 25, with the channel extending substantially for the entire width of the plate 25. The located position of the slide member 31 is obtained by tightening a cap screw 37 which extends through a slot 38 in the slide body 25 to engage in a captured nut 39 (FIG. 4). It will thus be seen that the width of the space between the slide members 29 and 31 can be varied by movement of the slide member 31 with respect to the slide member 29 and the said adjustment is maintained by tightening of the cap screw 37. The variation in effective slide width will be seen by comparing the broken and full line positions in FIG. 5 in which the narrowest width is shown slide member 31 in broken line position. As examples, the adjustment can provide for variation in component length between ½″ and 2″.

Figure 5:
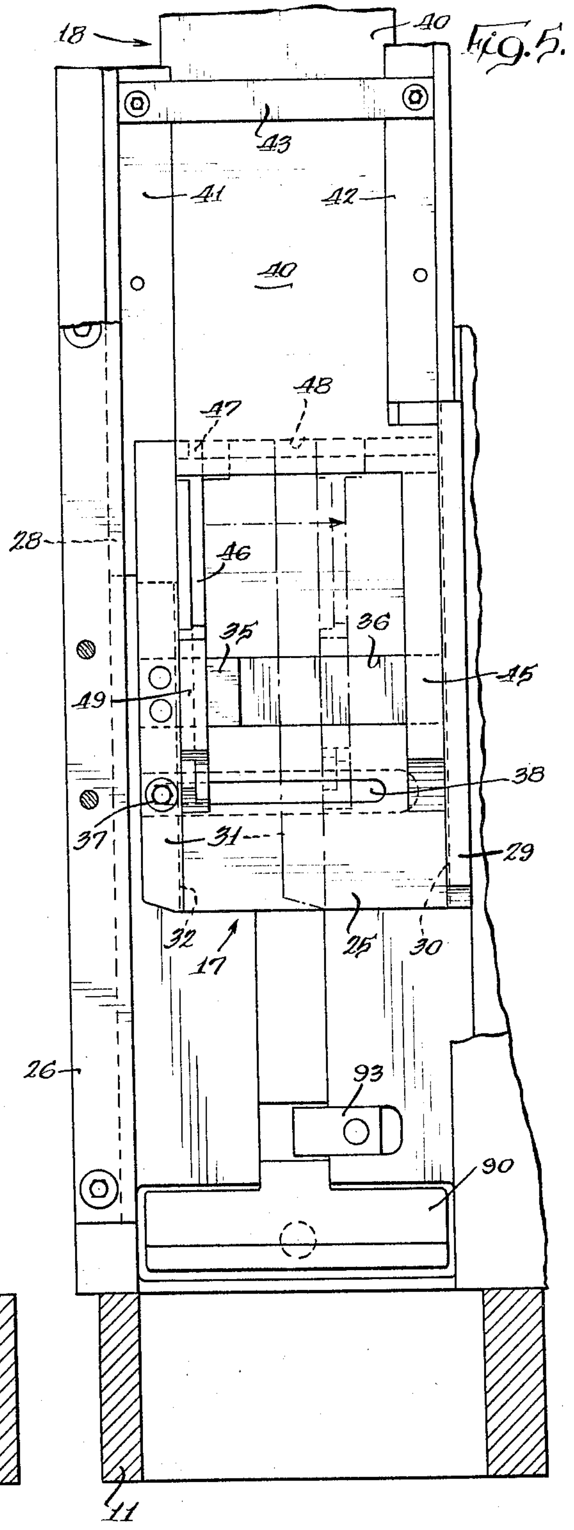
FIG. 5 is a vertical section taken generally along the line 5—5 in FIG. 4.

The ram 18 consists primarily of a plate 40 which is movable with the slide 17 and relative thereto. The ram plate 40 is movably guided on the slide body 25 by having the lateral extremities thereof fitted within a channel formed on the slide by plates 41 and 42 secured to the slide as shown in FIG. 5. The ram plate 40 is of two thicknesses, as shown at the upper end of FIG. 4, with a thicker section being located beneath a cross bar 43 secured to the slide plates 41 and 42. This cross bar assists in guiding of the ram relative to the slide and also provides a positive connection for return of the slide with the ram subsequent to insertion of a component, as subsequently described.

The ram plate 40 has an integral ram member 45 formed at one side at the lower end thereof forming an ejector pusher for the component and which is associated with the slide member 29 which forms and holds one end of the component.

The ram has a second member 46 which is laterally adjustable relative to the ram member 45 to again provide for variation in effective ram width and handling of components of various lengths. This lateral adjustment of the ram member 46 is obtained by having the ram member 46 drivingly connected to the ram plate 40, but adjustable relative thereto and simultaneously with the slide member 31. Specifically, the ram member 46 has an upper end formed with a forward projection 47, laterally movable in a groove 48 formed in the rear face of the ram plate 40 to provide a driving connection between these parts while permitting relative lateral adjustment. Additionally, the ram member 46, as particularly shown in FIG. 7, interfits with a channel or angle member 49 extending laterally from the slide member 31 to capture the ram member 46 while permitting sliding movement of the ram member relative to the angle member 49. As the slide member 31 is adjusted relative to the slide member 29, a corresponding adjustment is simultaneously obtained of the ram member 46 relative to the ram member 45 while at all times maintaining the drive connection between the ram member 46 and the ram plate 40.

Figure 8:
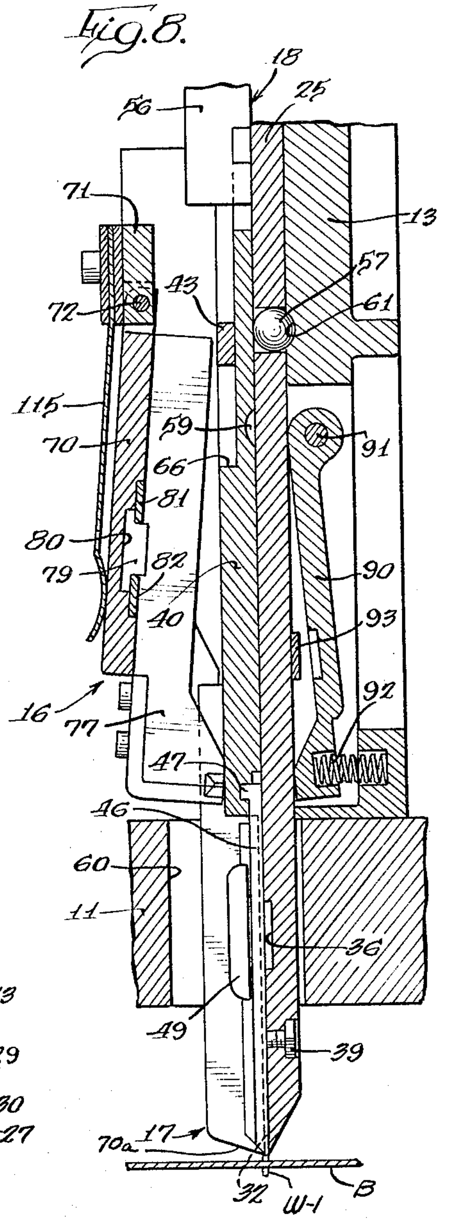
FIG. 8 is a view similar to FIG. 4 showing the parts in their lowermost component inserting position and as related to a circuit board.

The ram 18 and slide 17 are shown in their upper position in FIGS. 1 to 5 and in a lower extreme limit position in FIG. 8.

The cycling of the parts will be briefly described and reference may be made to the application of M. R. Parke and G. A. Gagnon, Serial No. 103,480, filed April 17, 1961, now Patent No. 3,102,324, for a more detailed description of the arrangement of the ram and slide in this general type of head and the cycle thereof. In first moving from the position shown in FIGS. 1 to 5, the air cylinder motor 14 moves the ram 18 downwardly, by a connection of the cylinder piston rod 55 to a connecting member 56 secured to the ram plate 40. This initial movement carries the slide 17 therewith by means of a roller clutch connection shown in FIG. 4 in which a roller 57 engages in a slot 58 in the slide plate 25 and in a notch 59 formed on the rear face of the ram plate 40. This movement carries the slide members 29 and 32 past the anvil 16 to shape the component and move the slide down into an aperture 60 in the base 11. The lowering movement of the slide is utilized to operate feeding mechanism 15, as shown in FIG. 2. A projection 62 on the slide (FIGS. 2 and 3) engages a lug 63 on a rack 64 which is part of the feeding mechanism 15 with lowering movement of the lug 63 and projection 62 continuing until it reaches abutment 65. A recess 61 (FIG. 8) in the frame member 13 is located to permit the clutch roller 57 to move away from the recess 59 in the ram plate 40, which frees the ram from the slide and the ram continues to move to its lower position, shown in FIG. 8 to eject the component from the slide and insert the component in a circuit board or the like.

Return movement is obtained by direct reverse action of the inner slide until re-engagement of the roller clutch between these parts and further insured by engagement of a ledge 66 formed by the differing width of the ram plate 40 engaging the underside of the cross plate 43 secured to the slide. The projection 62 engages an adjustable member 67 secured to the rack 64 which raises the rack by movement of the slide and the rack has an upper limit position of engagement with an adjustable stop 68 secured to the frame plate 12 as shown in FIG. 2. The stroke of the slide is determined by the full stroke of the air cylinder 14 with suitable adjustment being made by adjustment of connecting member 56.

The anvil 16 comprises a body 70 pivotally mounted on a mounting bracket 71 by a pin 72. The bracket 71 is attached to the frame plate 26 to secure the anvil to the shaping and inserting head.

Figure 6:
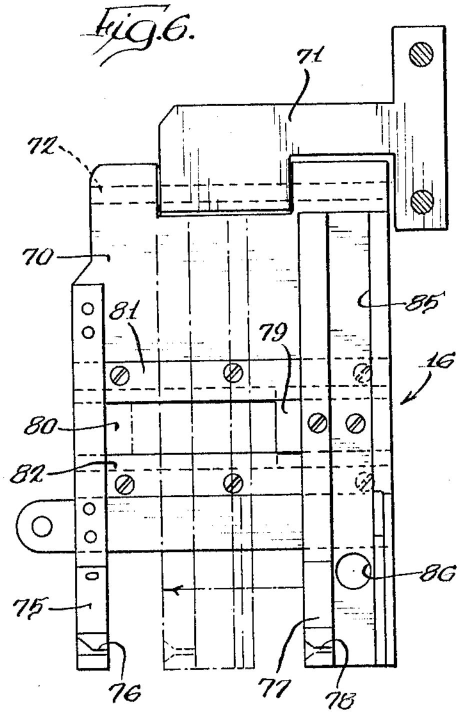
FIG. 6 is a vertical section taken generally along the line 6—6 in FIG. 4.

The anvil 16 constitutes a member for holding a length of jumper wire or a different component, while the ends thereof are shaped prior to insertion of the component. To accomplish this, the anvil body 70 has a first holding member 75 secured thereto formed with three sides of a generally rectangular slot 76 through which a length of wire is fed by the feeding mechanism 15. This member 75 is located closely adjacent to the path of the slide member 29 so that the slide member 29 will pass just to the outer side thereof. A second anvil member 77 is again formed with three sides of a generally rectangular slot 78 in alignment with the slot 76 to receive the leading end of a section of wire as it is fed by the feeding mechanism 15. The anvil member 77 is adjustable laterally with respect to the anvil member 75, similarly to the slide member 31 and ram member 49 to adjust for varying size of components to be shaped and inserted. This adjustment is accomplished by having a plate 79 secured to the adjustable anvil member 77 and fitted in a slot 80 formed on the rear face of the anvil body 70 with a headed end of the plate captured behind plates 81 and 82 secured by suitable cap screws to the rear face of the anvil body 70. This provides for retention of the anvil member 77 on the anvil body, while permitting lateral adjustment thereof between the full line and broken line positions shown in FIG. 6. The positioning of the anvil member 77 in relation to the adjustable slide member 31 and ram member 49 is obtained through the means of a channel 85 (FIG. 7) formed in the anvil member 77, which interfits with the adjustable slide member 31 as shown in FIG. 7. As pointed out previously, the retention of the adjustable parts in adjusted position is obtained by tightening the cap screw 37 which is mounted in the adjustable slide member 31 and access to this cap screw is obtained through an opening 86 in the member 85 when the slide 17 and ram 18 are in intermediate position between their top and bottom limits.

As pointed out previously, the anvil members 75 and 77 have three sides of slots 76 and 78, respectively, formed therein and in order to form a complete four-sided slot, a back-up member 90 is provided. This member, as shown in FIGS. 5 and 8, is pivotally mounted to the frame plate 13 by a pin 91 and is urged forwardly of the head about the pivot pin by a spring 92 with the forward limit position of the back-up member being determined by a fixed bracket 93 secured to the frame. The back-up member 90 is of a generally inverted T-shape and has its lower end of a width approximately equal to the maximum operative width of the head, as shown in FIG. 4, to form a complete slot for the jumper wire regardless of the adjusted position of anvil member 77.

The feeding mechanism 15 comprises a body 100 secured to the frame member 13 having an internal channel 101 for the jumper wire with the wire passing downwardly through the body 100 through a continuation of the channel as indicated at 102 and past an adjustable wire straightener 103. The straightener 103 assures that the wire is straight as it is fed outwardly of the channel 102 through the slot 76 of the anvil member 75 and on through the slot of anvil member 77 to extend a distance therebeyond to provide a length of wire for a downturned lead as formed by the slide member 31 and positioned in the slot 32 of the latter member. The feeding mechanism additionally includes the rack 64 previously referred to and a second rack 105, both of which are vertically movable within the feed body 100 and interconnected by a gear 104 for equal and opposite movement. The rack 105 carries a block 106 having a roller 107 mounted in a wedge-shaped opening 108 and urged upwardly by a spring 109. As the rack 105 is caused to move downwardly, the wire located within the slot 101 is engaged within the block 106 through which it extends and between a surface thereof and the roller 107 to feed the wire along the slot. On return upward movement of the rack 105, the roller 107 is ineffective and to insure that there is no retrograde movement of the wire, a second roller 110 is mounted near the lower end of the feed body in a wedge-shaped opening 111 and urged upwardly by a spring 112 whereby the roller will wedge against the wire to prevent retrograde movement.

The rack 105 is powered in its movements from the rack 64 through the intermediate gear 104 with the rack 64 deriving movement from the slide 17 as described previously. The length of wire fed can be varied by varying the stroke of the rack 64 by adjustment of the block 67 adjustably mounted thereon. A scale associated with block 67 indicates the setting thereof.

The general cycle of movement of the slide 17 and ram 18 has previously been described. These movements are related to the positioning of the anvil unit 16, as shown by comparison of FIGS. 4 and 8. Normally, the anvil unit 16 is positioned as shown in FIG. 4 and urged against the back-up member 90 by a spring 115 secured to the mounting bracket 71.

Figures 8A, 8B, 8C, 8D, 8E:
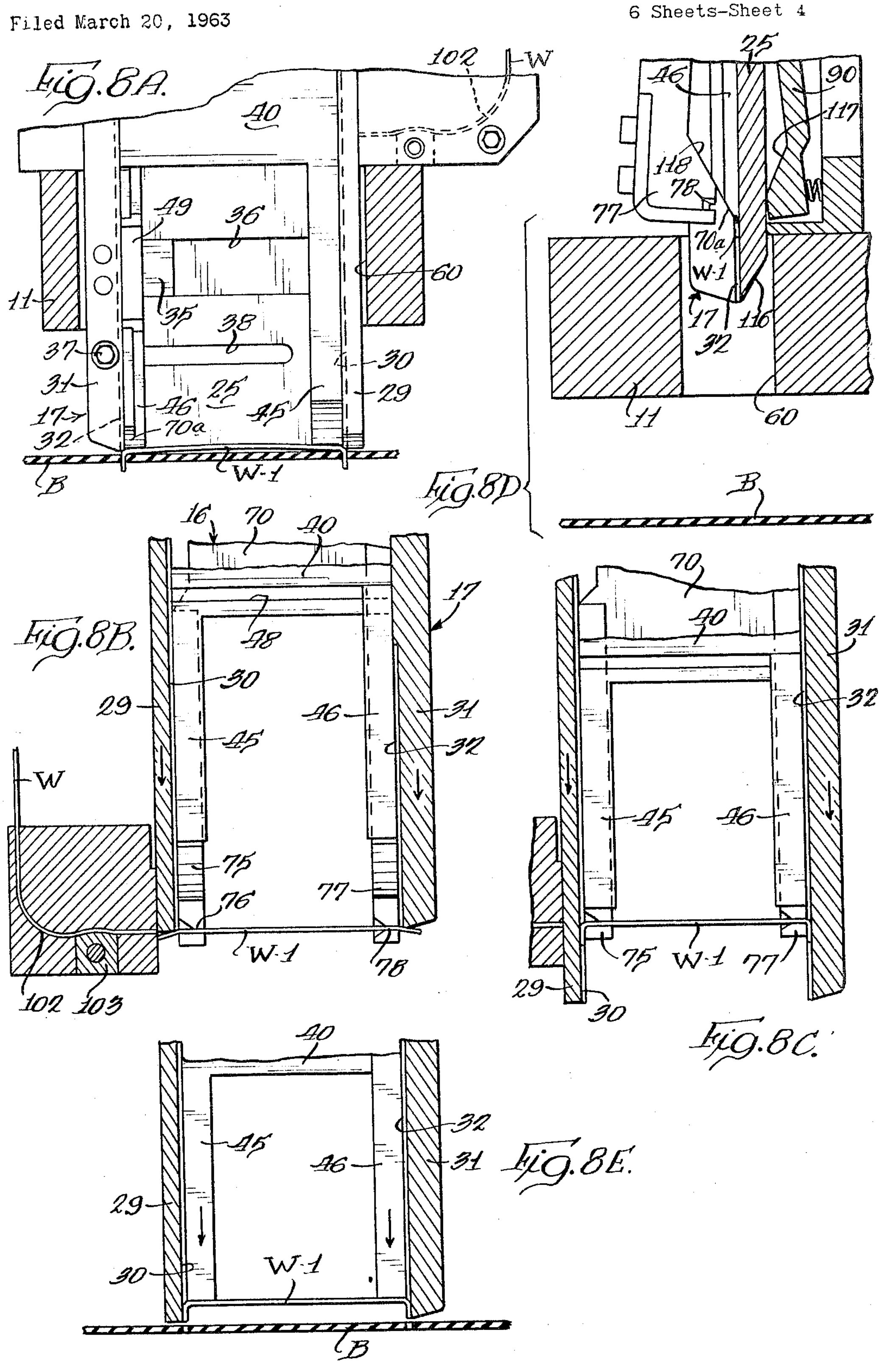
FIG. 8A is a central vertical section taken through the lower part of the structure shown in FIG. 8 from front to rear thereof and looking toward the right in FIG. 8.
FIG. 8B is a view similar to FIG. 8 with the operative structure shown immediately after wire cut off.
FIG. 8C is a view similar to FIG. 8B with the wire ends fully bent and with the anvil still engaging the wire.
FIG. 8D is a view similar to FIGS. 4 and 8, but with the parts shown positioned immediately after the anvil has been cammed away from the wire.
FIG. 8E is a view similar to FIG. 8 but with the parts positioned slightly above the lower limit position prior to inserting the wire into the circuit board.

In operation, a length of wire W is fed through the anvil slots 76 and 78 when the anvil is in the operative position shown in FIG. 4. As the slide 17 descends, the slide members 29 and 31 are moved downwardly to a position shown in FIG. 8B wherein the lower end of slide member 29 cuts off a jumper wire W–1 from the wire length W. Continued movement of the slide causes completion of bending of the wire ends to fully form the jumper wire W–1, as shown in FIG. 8C. In this position, the bent ends are confined within the slots 30 and 32 in the slide members 29 and 31, respectively. The ram members 45 and 46 have moved with the slide members, but are still above the jumper wire W–1, as shown in FIG. 8C. The bending caused by the slide members 29 and 31 is caused by bending of the wire about the edges of anvil slots 76 and 78, as shown in FIG. 8B. Up to the position shown in FIG. 8C, the jumper wire W–1 has been held in a fixed position by the anvil 16. As the slide members have moved past the anvil slots 76 and 78, a sloped surface 116 formed on the lower end of the slide members and at a lesser angle than a sloped surface 117 on the back-up member 90 engages therewith to move the back-up member to the position shown in FIGS. 8 and 8D. Further downward movement of the slide causes the lower sloped ends 70*a* of the ram members 45 and 46 to engage a sloped surface 118 on the rear side of the anvil members 75 and 77 to cam the anvil body 70 forwardly, with this camming action being shown in FIG. 8D and the extreme outward position of the anvil being shown in FIG. 8. This outward movement of the anvil has released the anvil from the formed jumper wire W–1, so that further downward movement of the slide carries the jumper wire W–1 to a position immediately above the circuit board B. This position is shown in FIG. 8E. At this location, the bent ends of the jumper wire are in alignment with receiving holes in the circuit board. The clutch including ball 57 releases the connection of the ram to the slide, so that the ram members 45 and 46 can move further downward and relative to the slide to push the jumper wire W–1 out of the slide slots 30 and 32 and into located position on the circuit board B, as shown in FIGS. 8 and 8A.

Figures 9, 10:
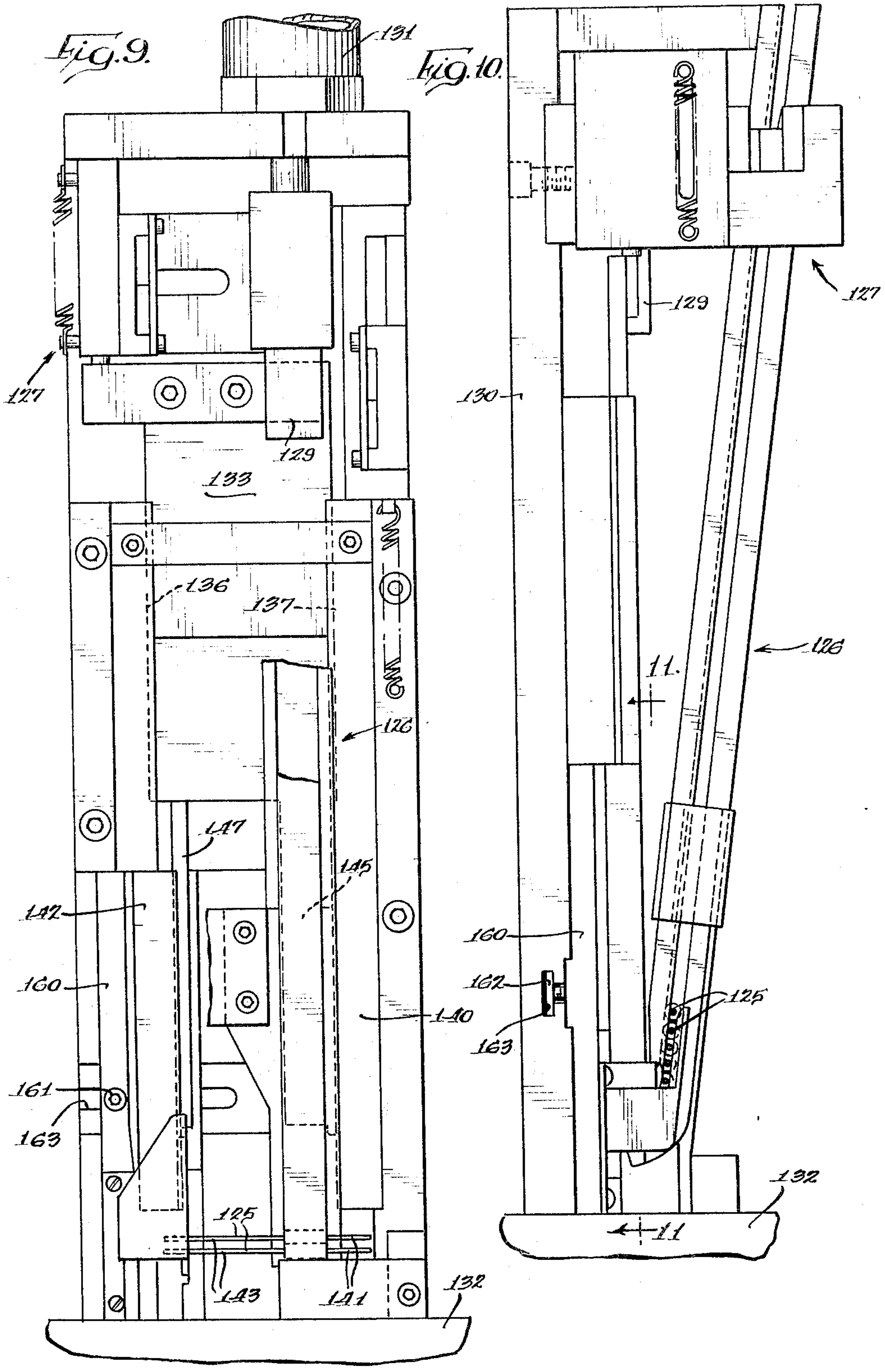
FIG. 9 is a front elevational view of another embodiment of component shaping and inserting head.
FIG. 10 is a side elevational view of the head shown in FIG. 9 looking toward the left-hand side thereof as viewed in FIG. 9.

In the embodiment shown in FIGS. 9 to 13, a different construction of component shaping and inserting head is shown, with the particular application being in connection with resistors, as indicated at 125 in FIG. 10 in which the resistor has a generally cylindrical body with leads extending from opposite ends thereof. This head has associated therewith a magazine, indicated generally at 126, and cut-off mechanism for trimming the ends of the leads, as indicated at 127. The magazine and cut-off mechanism are generally known in the art and reference may be made to prior patents for more specific disclosures thereof.

In this embodiment, the head has a frame with a plate 130 and a motor 131 mounted at the upper end of the plate and a base 132. The motor 131 connects with the upper end of a ram plate 133, as indicated at 129, with the ram plate being movable with, and relative to, a side having a base plate 134. The slide plate 134 moves relative to a back-up plate 135 secured to the frame plate 130. The lateral extremities of the ram plate 133, as indicated at 136 and 137, are positioned within channels formed in the slide plate 134 for guiding movement of the ram relative to the slide.

The basic number of components required for shaping and inserting the resistor component are the same as in the first embodiment. Specifically, the slide plate 134 has a member formed at the lower end at one side thereof as indicated at 140, which shapes a lead 141 of the resistor and a second member 142, which shapes the lead 143 of the resistor. The ram plate 133 has a pusher member 145 for removing the resistor lead 141 from a slot 146 in the slide member 140 and a pusher member 147 for removing the lead end 143 from a groove 148 in the slide member 142. The anvil mechanism comprises a pair of members 150 and 151, each having a notch 152 for receiving the leads 141 and 143 of a resistor as the resistor is fed from the magazine 126 in a known manner. The anvil members are each pivotally mounted and urged toward the front of the head with their normal position being located rearwardly of the shaping location. Specifically, as shown in connection with the anvil member 151, it is pivoted on a pivot pin 153 and urged forwardly by a spring 154.

As in the first embodiment, one member of the slide, one member of the ram and one member of the anvil are mounted for movement relative to their corresponding members to provide for handling resistors or other components of variable length. In this embodiment, this is accomplished by having all three of the movable members supported on a block 160 which is mounted against the frame plate 130 and is laterally adjustable and held in adjusted position by a cap screw 161 having a captured nut 162 disposed in a slot 163 formed in the face of the frame plate 130. The slide member 142 is movably mounted for lengthwise movement along the block 160 by an interfitting tongue and groove, as indicated at 165, and the ram pusher member 147 is mounted on the slide member 142 by an interfitting flange connection as indicated at 166. The pivot pin 153 for the anvil member 151 is mounted in the block 160, as shown in FIG. 12.

Figure 11:
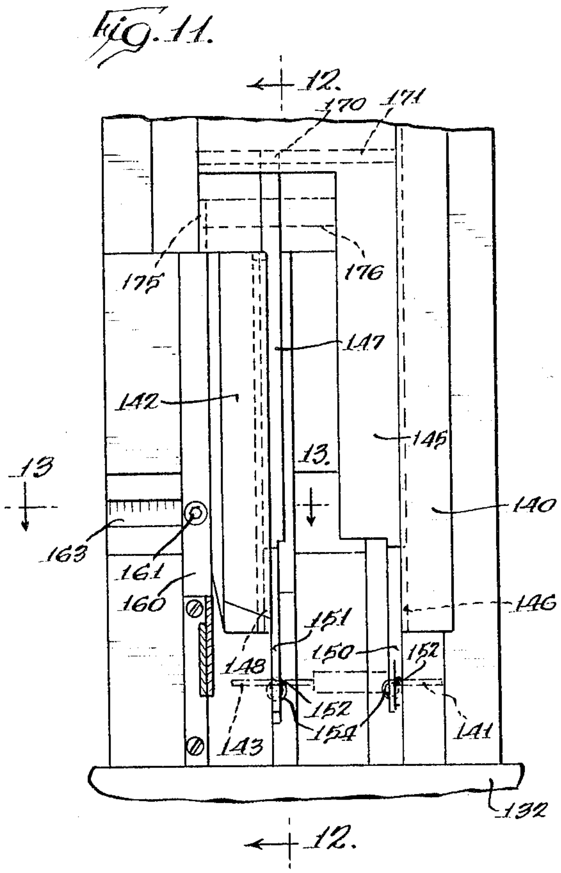
FIG. 11 is a section on an enlarged scale taken generally along the line 11—11 in FIG. 10.
Figure 12:
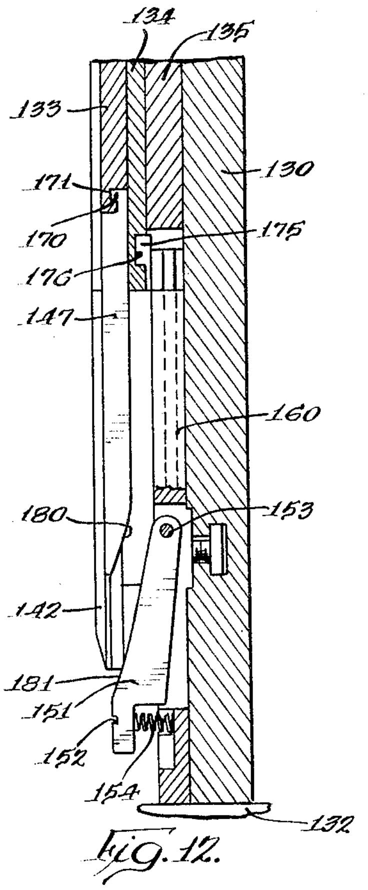
FIG. 12 is a section taken generally along the line 12—12 in FIG. 11.
Figure 13:
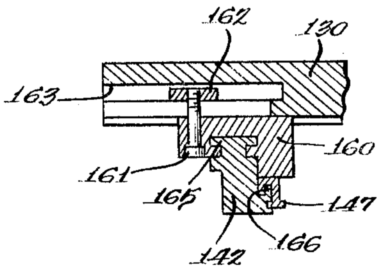
FIG. 13 is a fragmentary section taken generally along the line 13—13 in FIG. 11.

In order to provide for the lateral adjustment of the ram pusher member 147 and the slide member 142, each of these parts has a drive connection to its respective ram plate 133 and slide plate 134, as shown in FIGS. 11 and 12. The ram pusher member 147, at its upper end, has a projection 170 engaging in a slot 171 of the ram plate 133 maintaining a drive connection therebetween, while permitting lateral adjustment of the pusher member 147.

The slide member 142 has a lug 175 formed at its upper end engaging in a slot 176 of the slide plate 134, providing the drive connection, while permitting lateral movement.

The cycle of movement of the parts in this head is basically the same as that in the embodiment of FIGS. 1 to 8 with the ram pusher members having a sloped lower end, as indicated at 180 for the pusher member 147, engageable with a sloped surface 181 on the front face of the anvil member for camming the anvil member rearwardly to release the member from the component. A similar action occurs between the ram pusher member 145 and the anvil member 150.

It will be seen from the foregoing that an inserting head may be utilized having the versatility to handle many components which heretofore have required separate heads.

I claim:

1. An inserting head for shaping and inserting an electrical circuit component including, a head frame, a forming anvil mounted on said frame, a slide movable on said frame relative to said anvil to form said component and carry said component away from the anvil, a ram movable relative to said slide for ejecting a formed component from said slide, and means mounting parts of said ram, slide, and anvil for interrelated movement relative to other parts of said ram, slide and anvil respectively to provide for different lengths of components to be shaped and inserted.

2. A component shaping and inserting head comprising, a frame, a forming anvil for receiving a component to be shaped, said anvil having two members movable one relative to the other to vary the effective width of the anvil, a slide movable on the frame past the anvil to bend and receive the component ends extending from the anvil, said slide having two members movable one relative to the other to vary the effective width of the slide, and a ram movable with and relative to the slide to eject a component from said slide, said ram having two members movable one relative to the other to vary the effective width of the ram whereby the anvil, slide and ram may operate to shape and insert components of differing lengths.

3. A component inserting and shaping head as defined in claim 2 in which the movable members of the anvil, slide and ram are interconnected for simultaneous adjustment.

4. A head for inserting a jumper wire in a circuit board comprising, a frame, a wire former on the frame for holding a length of wire with exposed ends, a slide movably mounted on the frame, means at the end of the slide defining a pair of spaced apart slide members for passing along the former to bend and hold the wire ends, a ram movable with and relative to the slide, means at an end of said ram defining a pair of spaced apart ram members for engaging a jumper wire held in the slide members and ejecting said wire therefrom, means movably mounting one each of the ram and slide members toward the other of said pairs of members to handle varying lengths of wire, means for holding the movably mounted members in adjusted position, and means for moving said ram and slide relative to the frame.

5. A head as defined in claim 4 in which said wire former comprises a pair of spaced apart members with one of said last-mentioned members being interfitted with said movable ram and slide members for adjustment therewith.

6. A head for inserting a jumper wire in a circuit board comprising, a frame, an anvil on the frame for holding a length of wire with exposed ends, a slide movably mounted on the frame, means at the end of the slide defining a pair of spaced apart slide members for passing along the anvil to bend and hold the wire ends, a ram movable with and relative to the slide, means at an end of said ram defining a pair of spaced apart ram members for engaging a jumper wire held in the slide members and ejecting said wire therefrom, means movably mounting one of said pair of slide members on the slide for adjustment toward and away from the other of said pair, means movably mounting one of said pair of ram members for adjustment toward and away from the other of said pair, means slidably interfitting said movably mounted members for simultaneous adjustment while permitting movement one along the other, means for securing the movable slide member to the slide to maintain the adjusted position for a desired length of jumper wire, and means for moving said slides and ram lengthwise in a cycle of operation.

7. A head as defined in claim 6 in which the anvil comprises a pair of spaced members located to lie closely adjacent the path of said slide members, means mounting one of said anvil members for movement relative to the other to adjust for the length of jumper wire being handled, and means connecting the movable anvil member for adjustment with the movable members of the ram and slide.

8. A head for inserting an electrical component in a circuit board comprising, a frame, an anvil on the frame for holding a length of wire with exposed ends, a slide movably mounted on the frame, means at an end of the slide defining a pair of spaced apart slide members for passing along the anvil to bend and hold the wire ends, a ram movable with and relative to the slide, means at an end of said ram defining a pair of spaced apart ram members for engaging a component held in the slide members and ejecting said component therefrom, means movably mounting one of said slide members on the slide for adjustment toward and away from the other of said pair, means movably mounting one of said ram members on the movable slide member for adjustment toward and away from the other of said ram members, and means for securing the movable slide member to the slide to maintain the adjusted position of the slide and ram members for a desired length of component.

9. A head for inserting a component in a circuit board comprising, a frame, an anvil on the frame for holding a component with extended leads, a slide movably mounted on the frame with a pair of spaced apart slide members for passing along the anvil to bend and hold the leads, a ram movable with and relative to the slide and having a pair of spaced apart ram members for engaging a component held in the slide members and ejecting said component therefrom, means movably mounting one each of the inner and outer slide members toward the other of said pairs of members, and means for holding the movably mounted members in adjusted position.

10. A component inserting head comprising, a frame, a component forming slide with a plate-like body movable on said frame having a pair of slide members in spaced apart relation at the lower end thereof and positioned forwardly of said body, one of said slide members being separate from said body, means adjustably mounting said separate slide members on the body for movement toward the other slide member, a slidable connection between said movable slide member and body permitting the adjusting movement while maintaining a drive connection therebetween, a component ejecting ram mounted on said slide body for movement with and relative to said slide, a pair of spaced apart ram members positioned adjacent the slide members with one ram member being integral with the ram and the other ram member being separate, means on the movable slide member carrying the separate ram member for movement therewith in adjusting movement of the spacing between the ram members and slide members with the separate ram member being movable lengthwise relative to the associated slide member, and means providing a slidable drive connection between the ram and the separate ram member, whereby the effective width of the ram and slide can be adjusted for the length of component to be shaped.

11. A head as defined in claim 10 in which said means for adjustably mounting the separate slide member comprises a block movably mounted on the slide body, an anvil member coacting with the separate slide member and means on the block pivotally mounting said anvil member thereon.

12. A head as defined in claim 10 in which an anvil is mounted on said frame, said anvil having a body and a pair of spaced apart anvil members, means mounting one of said anvil members for movement relative to the other to vary the effective width of the anvil, and a channel configuration on the movable anvil member interfitting with the movable slide member to obtain simultaneous and equal adjustment of the anvil member with the movable ram and slide members.

13. A component inserting head comprising, a frame, a slide movably mounted on the frame and having a pair of spaced apart slide members, an ejecting ram movable with and relative to the slide and having a pair of spaced apart ram members for engaging a component held in the slide members and ejecting said component therefrom, and means mounting one each of the ram and slide members toward the other of said pairs of members to vary the effective width of the ram and slide whereby a single head can handle components of different lengths.

References Cited by the Examiner

UNITED STATES PATENTS

| | | | |
|---|---|---|---|
| 2,963,053 | 12/1960 | Ferm | 140—123 |
| 3,122,826 | 3/1964 | Self | 242—7 |

CHARLES W. LANHAM, *Primary Examiner.*

W. H. JUST, *Assistant Examiner.*